Figure 1:
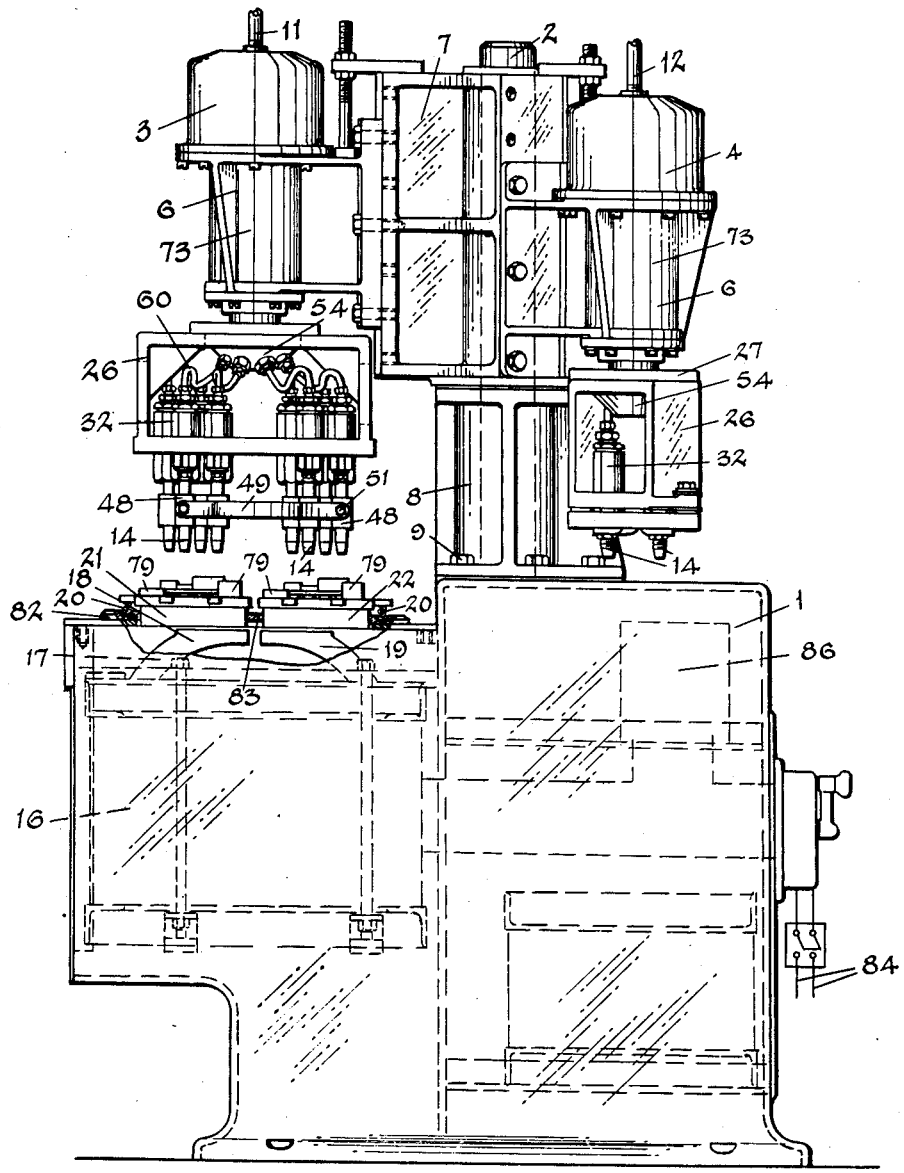

Oct. 26, 1937.  W. H. MARTIN  2,097,377
WELDING MACHINE
Filed May 29, 1936  3 Sheets-Sheet 2
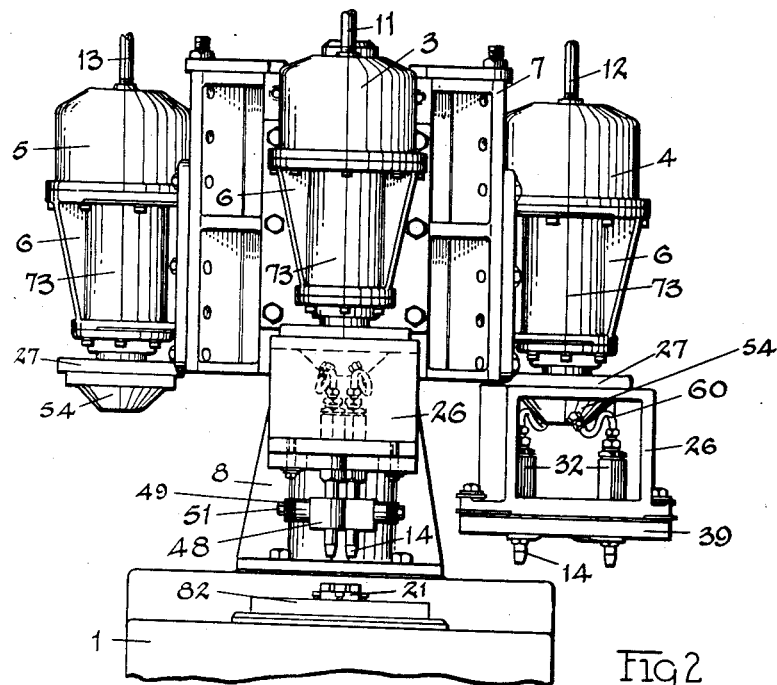
Fig 2
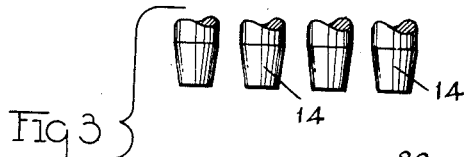
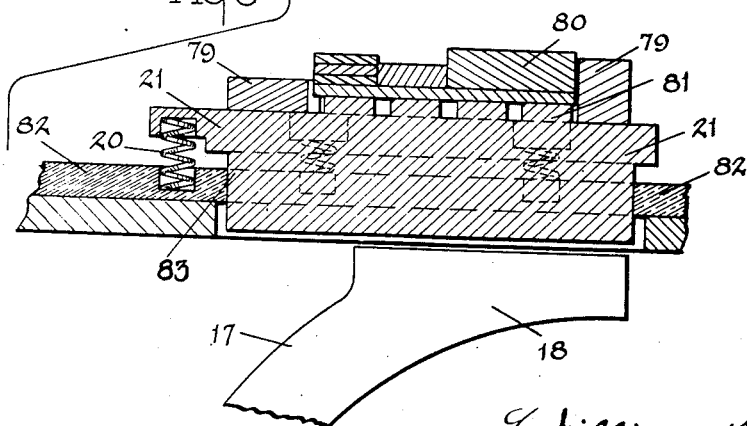
Fig 3
Inventor
William H. Martin
By Faust H. Crampton
Attorney

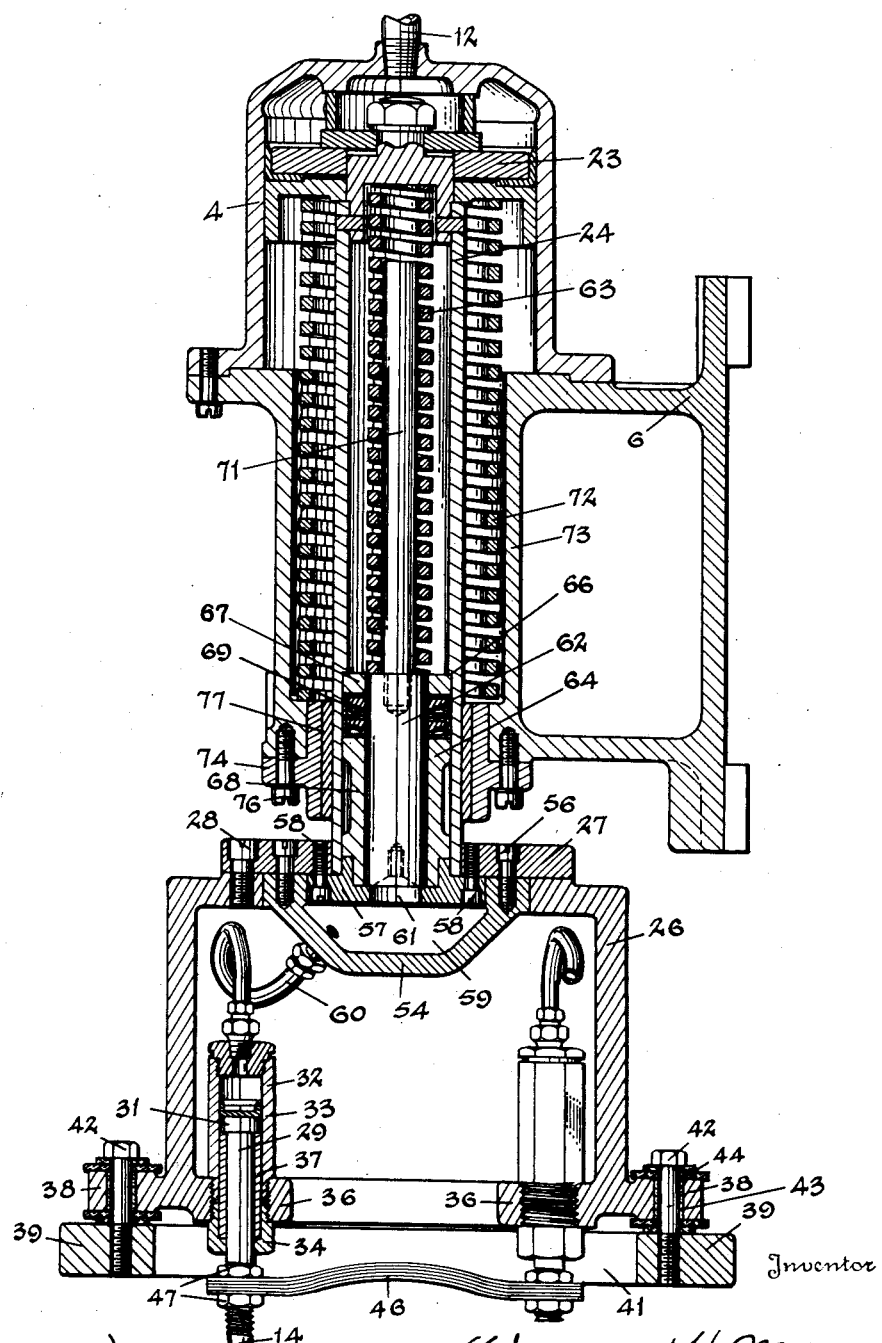

Patented Oct. 26, 1937

2,097,377

UNITED STATES PATENT OFFICE 2,097,377

WELDING MACHINE

William H. Martin, Detroit, Mich.

Application May 29, 1936, Serial No. 82,414

9 Claims. (Cl. 219—4)

My invention has for its object to provide a welding machine having a plurality of welding heads rotatably supported on a pedestal for convenience of location of the welding heads with respect to the terminals of a source of welding current for welding parts of an article together. The invention may be used for a great variety of purposes, but is particularly advantageous in its use in the assembly of parts of articles to secure the said parts together. The invention thus eliminates riveting and the like. The parts of the articles may be progressively assembled as on a movable member, such as a turntable, and may be welded together in a single welding operation, or may be progressively welded in the assembly.

The invention provides one or more dies for receiving one or more articles, the dies being preferably movable supported with reference to the terminals of the source of the welding current to enable the completion of the circuit through the work and the welding points when the welding points press against the work.

The invention also provides a means for connecting a plurality of articles with a source of welding current to produce a flow of a welding current through the articles in series or a divided flow of the welding current through the articles in parallel, or to produce welds by a combination of series and parallel circuits of the welding current through the articles. The invention also provides means for connecting an article with a source of welding current to produce the flow of the current through parts of the article in series, or to direct a divided flow of the welding current through parts of the article in parallel, or to produce a combination of series and parallel flow of the welding current through parts of the article.

The invention also provides a welder machine having a plurality of connected welders operated by a common pressure means to produce a controlled pressure of each of the welding points against the work. The invention also provides means for transmitting the pressure to the welding points through a confined liquid. Preferably the welding points are connected to pistons, and the fluid under pressure is directed into cylinders that operate the pistons, the pistons and the cylinders having substantially the same diameter to produce the same pressure on the welding points.

The invention also provides a plurality of welding points actuated by a common pressure means, but which operate independently of each other. The invention particularly provides a welding machine having welding points electrically connected together in pairs and upon pressure of the points against the articles, the welding points connect the articles to the terminals of a source of supply of a welding current and produce a flow of the welding current through the points of each pair in series and the flow of the current through the pairs in parallel.

The invention consists in other features that will appear hereinafter and upon examination of the drawings. The invention may be contained in structures that vary in their details. To illustrate a practical application of the invention, I have selected a welding machine containing the invention as illustrative of the different forms of structures that may contain the invention. The particular welding machine selected as an example is illustrated in the drawings and is described hereinafter.

Fig. 1 illustrates a side view of the welding machine referred to. Fig. 2 is a front view of the upper part of the machine illustrated in Fig. 1. Fig. 3 is a section of parts of the machine showing the relation of certain of the welding points and one of the terminals of the source of the welding current to a conventionally illustrated article having a plurality of assembled parts to be connected together by the welding operation. Fig. 4 is a view of a section of one of the heads of the machine and illustrates the interconnection of a pair of welding points.

As shown in Fig. 1, the machine is provided with a base part 1 on which a suitable pedestal 2 is mounted. Three welder heads 3, 4, and 5 are secured by means of brackets 6 to a turret 7 at points disposed 120° apart about the vertical axis of the pedestal 2. The pedestal 2 is cylindrical in form and is supported in a vertical position by means of a boot or sleeve 8, reinforced by suitable flanges, and connected to the base 1 by means of the bolts 9. Each of the heads 3, 4, and 5 has one or more welding points and means for directing the welding points to the work. The machine is provided with movable parts that support the welding points and has a suitable pressure means for actuating the movable parts to move the welding points against the work and connect the work with the source of welding current. In the form of construction shown, the heads 3, 4, and 5 are connected with a controlled source of supply of air under pressure by means of the pipes 11, 12, and 13. The welding points 14 are arranged in pairs, one of each pair being disposed above a part of the base 1 containing a transformer 16 and a secondary 17. The secondary may be a split ring of copper having the terminals 18 and 19 located contiguous to a movable table or in the plane of the top of the base. In the form of construction shown, a pair of movable dies or blocks 21 and 22 are located in openings formed in the top of the base and are spring pressed by the springs 20 to raise the blocks relative to the plane of the top of the base. The springs 20 are located in suitable sockets formed in the blocks and the base and distributed peripherally with respect to the blocks. The springs operate to yieldingly hold the blocks away from the terminals of the secondary 17 of the transformer 16. The upper surfaces of the blocks may be shaped or provided with parts for receiving and holding parts of the work in alignment with the welding points. The lower surfaces of the blocks are adapted to make contact with the terminals 18 and 19 of the secondary when the work is depressed by the downward movement of the welding points.

Each of the welding heads 3, 4, and 5 is provided with a piston 23 that may be pneumatically operated to lower and press the welding points against the work. The piston 23 has a hollow piston rod 24 that is connected to a housing 26 by means of a plate 27. The plate 27 is secured to the hollow piston rod 24 by a press fit and is connected to the housing 26 by means of the threaded studs or bolts 28.

The welding points of the welders of each housing are independently actuated by a pressure means that may be, if desired, dependent on the pressure exerted by the piston 23. Each housing may be provided with any required number of welding points, and the welding points may be arranged in the housing as required to produce the welds at desired points in the work.

The welding points are operated by a confined fluid through which the pressure exerted by the piston 23 is transmited. The welding points 14 are connected to the piston rods 24 and are operated by the movements of the pistons 31 located in the cylinders 32 which are connected to a chamber formed in the housing and are subject to a desired pressure and equal to that exerted by the piston 23.

The cylinders 32 are formed of two threaded parts 33 and 34. The lower end of the housing 26 is provided with an inwardly extending flange part 36 having tapped openings for receiving the threaded parts 33 and 34 on opposite sides of the flange part. The parts 33 and 34 of each cylinder 32 are thus coaxially located. A bushing 37 may be located in the cylinder 32, and a piston rod 29 may be located within the bushing 37. If desired, the lower end of the housing may also be provided with ears or outwardly extending flanges 38, and an oblong frame 39 having a central opening 41 may be insulatingly connected to the ears or flange 38 by means of the bolts 42 located in suitable insulated bushings 43 and washers 44. The frame 39 forms a guard to prevent contact with the parts through which the welding current flows.

The welding points 14 are connected in pairs by suitable flexible conductors 46 (Fig. 4). The lower ends of the piston rods 29 may be threaded, and the ends of each of the flexible conductors 46 may be connected to the ends of the piston rods by means of suitable clamping nuts 47, or if desired, conductor blocks 48 may be connected to the piston rods 29 and flexible conductors, such as the conductors 49, may be connected to the sides of the blocks by the bolts 51 (Fig. 1). Where two pairs of welders are located in the housing 26, the flexible conductors 49 may be located on opposite sides of a transversely extending center line between the pairs of welding points. Where the housing 26 has more than two pairs of welding points, the flexible conductors may be bent laterally and located in spaced relation and one within the other to insure flow of the welding current through one pair of welding points independent of the flow of the current through other pairs of the welding points.

The pistons 31, and consequently the welding points 14, are pressed against the work by the pressure of a confined fluid, preferably oil. The upper end of each housing 26 is provided with a depending shell 54. The upper edge of the wall of the shell 54 is connected to the plate 27 by means of the bolts 56 and is closed by a plate 57 that is connected to the plate 27 by means of the bolts 58 to form the chamber 59. The cylinders 32 of the housing are connected to the chamber 59 by means of the flexible tubes 60. The plate 57 has a central opening 61 that is normally closed by means of a piston 62. The piston 62 is normally spring pressed against the plate 57 by means of the spring 63.

The piston 62 of each welder head is slidably movable within a cylinder 64 secured in the lower end of the hollow piston rod 24. The lower end of the piston rod 24 may be provided with a shoulder 66 against which the cylinder 64 may be pressed or secured when the plate 57 is secured to the plate 27 by the bolts 58. If desired, the cylinder 64 may be formed of two parts 67 and 68, and suitable packing elements 69 may be located intermediate the parts to prevent the escape of the oil. The spring 63 is so formed as to produce a resistance to the movements of the piston 23 that corresponds to the total of the required welding pressures of the welding points located in the housing with which the spring is associated. Thus each spring 63 yieldingly resists the movement of its associated piston 23 when the welding points engage the work until a pressure of the spring 63 rises to a point sufficient to produce the required welding pressure on each of the welding points. Each piston 23 is spring pressed by means of a spring 72 located within a cylindrical shell 73 forming a part of each of the brackets 6. The lower end of the spring 72 engages the lower end of the shell 73, which is provided with a head 74 that is secured to the shell by means of the bolts 76. The hollow piston rod 24 slidably fits a bushing 77 located in the head 74 and thus aligns the housing 26 with the actuated parts of the welder head. The spring 72 operates to return the piston 23 and raise the welding points from the work when the air pressure on the piston is released.

The dies or blocks 21 and 22 may be provided with a pair of adjustable jaws 79 for clamping the parts 80 of the article or for temporarily holding the parts in position with respect to each other (Fig. 3). The tops of the blocks 21 and 22 are preferably provided with projections or nubs 81 that may be, if desired, adjustably positioned on the upper parts of the blocks. The nubs are preferably located in line with the axes of the welding points to insure localization of the pressure exerted by the welding points and the consequent localization of the flow of the current. The dies or blocks 21 and 22 are normally supported by the springs 20 on a plate 82. The plate 82 has openings 83 in which the lower parts of the blocks 21 and 22 are located and through which they are moved against the pressure of the springs 20 to engage the terminals 18 and 19 of the secondary 17 of the transformer 16 when the welding points engage the work.

The primary of the transformer 16 is connected to a source of supply of electric current, such as to the main lines 84 of a commercial circuit. The transformer may be connected through a suitable relay controlled by a switch operated by the downward movement of the housing of the welder head located above the work, and the period of flow of the welding current may be controlled by a suitable time relay 86 indicated in Fig. 1. Any one of the well-known welder controlling circuits may be used in conjunction with the machine for initiating and terminating the flow of the welding current within the pressure periods of the welding points against the work.

In the operation of the machine, the parts of the article may be placed on the blocks 21 and 22, and the head having the required number of welding points to produce the desired welds is located in position. The cylinder of the welder head thus disposed is then connected with the source of supply of air under pressure by a suitable valve. The piston 23 descends against the yielding pressure of the spring 72 and moves the welding points against the work and the blocks 21 and 22 against the terminals 18 and 19. Upon further downward movement of the piston 23, the welding points 14, operating through the pistons 31, force the liquid in the chamber 59 outwardly through the opening 61 to force the piston 62 against the spring 63 that resists such movement sufficiently to produce a welding pressure of the points against the work. A suitable switch may be automatically or manually closed to connect the primary of the transformer with a source of supply of electric current and cause a welding current to flow through the blocks 21 and 22, the work, and the welding points.

When the exceedingly short time required to produce the welds has elapsed, the flow of the welding current is either manually or automatically discontinued, and the pressure on the pistons 31 is released. The piston 23, under the pressure of the spring 72, is returned and the housing 26 is raised, and the welding points are moved from the work. If desired, additional parts may be placed upon the work, and another head having the required number of welding points to produce the welds necessary for the attachment of the additional parts may be located in alignment with the work.

If desired, a plurality of pairs of dies or blocks may be located on a rotative circular table, and the article may be progressively assembled by a number of operators located at different points around the circular table. The table may be moved step by step from one point or stage to another as it receives the assembled parts and when completed, the housing 26 of the selected welding head may be lowered to produce required welds through the plurality of contacting parts that may be progressively compiled on the dies.

The welds will be produced in line with the welding points and the contact nubs or projections. Owing to the latitude of relative vertical movements of the welding points, the work contacting ends of the welding points may be located at different levels that may be necessary, due to the contour or difference of height of the compiled parts, in line with the welding points. Notwithstanding the variation in the positions of the welding points, the pressure of all of the welding points will be the same or, if the cylinders 32 differ in diameters, the pressure of the points will be in definite proportion to each other. Also in case of wear or shortening of the welding points, there will be the same automatic adjustment of the welding points relative to each other by reason of the transmitted pressures through the fluid which will maintain the same pressure or the fixed proportional pressure in the cylinders, notwithstanding the variation of the strokes of the pistons.

I claim:

1. In a welding machine, a plurality of welders, a movable member for supporting the welders, each of the welders comprising a welding point and a piston and cylinder for pressing the welding point against the work, means for actuating the member to move the welding points against the work, a fluid pressure means connected to the cylinders to produce the same pressures in the cylinders simultaneously, a source of supply of welding current, and a contact block for supporting the work, the fluid pressure means operative to press the welding points against the work and the block against a terminal of the said source for producing a welding pressure of the points against the work and means for connecting the work with said source.

2. In a welding machine, a plurality of welders, a movable member for supporting the welders, means for actuating the member, each of the welders comprising a welding point and a piston and cylinder for pressing the welding point against the work, a fluid pressure means connected to the cylinders to produce the same pressure in the cylinders simultaneously, a source of supply of welding current, a pair of movable elements for supporting the work and operable by the pressure of the welding points to connect the work supported on the elements to the terminals of the said source, and means for connecting each of the welding points that operate one movable element in series with a welding point that operates the other movable element to produce a divided flow of the current through pairs of the welding points and means for causing flow of the welding current through the welding points and the work.

3. In a welding machine, a welder head, a member slidably supported in the welder head, a plurality of welders supported on the member, each of the welders comprising a piston and a cylinder and a welder point connected to the piston, pairs of the welding points electrically connected together, a confined fluid contained within the member and the cylinders for transmitting pressure throughout the fluid, means for actuating the member, a resilient means operated by the pressure of the fluid produced by the pistons for resiliently resisting the movement of the member and the cylinders for producing a welding pressure of the welding points against the work, a source of welding current, a pair of contact blocks for supporting the work, the welder points of each pair operative to press the parts of the work on the blocks and the blocks against the terminals of the said source for connecting the work and the welder points to the said source and means for causing flow of the welding current.

4. In a welding machine, a plurality of welders, each of the welders comprising a welding point and a piston and cylinder for operating the welding point, a fluid pressure means connected to the cylinders for simultaneously producing the same pressure in the cylinders and pressing the welding points against the work, means for electrically connecting the welding points in pairs, a pair of contact blocks for supporting the parts of the work, each pair of welding points operative to engage the parts of the work supported on the blocks, a source of welding current, the welding points operative to press the blocks against the terminals of the source of welding current, and means for causing flow of the welding current through the work and the welding points of each pair.

5. In a welding machine, a turret, a vertical pedestal for supporting the turret, a plurality of welder heads mounted on the turret, members slidably supported in the welder heads, a plurality of welders supported on each of the members, each of the welders comprising a piston and a cylinder and a welder point connected to the piston, a confined fluid contained within each member and its associated cylinders and operative to transmit pressure to and from the member and the cylinders, means for actuating the members, a resilient means for yieldingly resisting the movement of each member relative to its associated welding points, means for transmitting the pressure of the yielding means through the fluid to produce a welding pressure of the welding points against the work, a source of supply of welding current, and means for causing the flow of the welding current through the welding points and the work.

6. In a welding machine, a plurality of welders, each of the welders comprising a cylinder, a piston, and a welding point connected to the piston, a movable member for supporting the welders, means for moving the member to move the welding points against the work, a confined fluid contained within the member and the cylinders and operative to transmit pressure through the fluid, a pressure means for moving the member relative to the welding point and to uniformly raise the pressure in the cylinders and produce a welding pressure of the welding points against the work, a source of supply of welding current, and means for causing flow of a welding current through the work and the welding points.

7. In a welding machine, a plurality of welders, each of the welders comprising a cylinder, a piston, and a welding point connected to the piston, a movable member for supporting the welders and having a chamber, a source of supply of welding current, an actuating means for moving the member and locating the welding points against the work and connecting the work to the terminals of the source, a confined fluid contained within the chamber and the cylinders and operative to transmit pressure throughout the fluid, a pressure means for raising the pressure in the fluid and operated by the actuating means for simultaneously raising the pressures of the welding points against the work, a source of supply of welding current, and means for causing flow of the welding current through the work and the welding points.

8. In a welding machine, a welder head, a member slidably supported on the welder head and having a chamber, a plurality of welders supported on the member, each of the welders comprising a piston, a cylinder, and a welding point connected to the piston, a confined fluid contained within the chamber and the cylinders for exerting the same pressure in the cylinders and the chamber, an actuating means for moving the member and locating the welding points against the work, a pressure means for raising the pressure of the fluid, a resilient means operated by the actuating means for transmitting pressure from the actuating means to the pressure means, and means for causing a welding current to flow through the welding points and the work.

9. In a welding machine, a welder head, a member slidably supported in the welder head, a plurality of welders supported on the member, each of the welders comprising a piston and a cylinder and a welder point connected to the piston, pairs of the welder points electrically connected together, a confined fluid contained within the member and the cylinders for transmitting pressure throughout the fluid, means for actuating the member, a resilient means operated by the pressure of the fluid produced by the pistons for resiliently resisting the movement of the member and the cylinders for producing a welding pressure of the welding points against the work, a source of welding current, and means for causing flow of a welding current through the work and the welding points.

WILLIAM H. MARTIN.